E. GOILEAU.
FLUID PRESSURE PUMP.
APPLICATION FILED JUNE 11, 1915.

1,198,836.

Patented Sept. 19, 1916.
2 SHEETS—SHEET 1.

Witnesses

Inventor.
Eugène Goileau,
By
Attorneys

E. GOILEAU.
FLUID PRESSURE PUMP.
APPLICATION FILED JUNE 11, 1915.

1,198,836.

Patented Sept. 19, 1916.
2 SHEETS—SHEET 2.

Witnesses
le Patenaude
M. Patenaude

Inventor
Eugène Goileau,

By Pigeon Pigeaut Davis
Attorneys

UNITED STATES PATENT OFFICE.

EUGÈNE GOILEAU, OF MONTREAL, QUEBEC, CANADA.

FLUID-PRESSURE PUMP.

1,198,836.

Specification of Letters Patent. Patented Sept. 19, 1916.

Application filed June 11, 1915. Serial No. 33,606.

*To all whom it may concern:*

Be it known that I, EUGÈNE GOILEAU, a citizen of the French Republic, and residing at the College of Montreal, in the Province of Quebec, Canada, have invented certain new and useful Improvements in Fluid-Pressure Pumps; and I do hereby declare that the following is a full, clear, and exact description of the same.

The invention relates to a "fluid pressure pump" and the object is to devise a cheap, simple and efficient device for raising liquids such as water by steam or air pressure.

In carrying out the invention, a collecting tank is provided into which the water runs and from which it is forced. The water rises in this tank until a pivoted float, swinging on its pivot, transfers movement to a pair of valves in the fluid pressure supply pipe, which is also connected to the top of the tank. These valves are arranged one on each side of the connection to the tank and operate in opposition, that is to say, when one closes the other opens therefore when the float swings, the valve on the inlet side is caused to open, permitting the entrance of the pressure fluid, such as steam, to the top of the tank and, pressing on the water within the tank, forces it through the outlet pipe at the bottom. When the float falls again, the inlet valve is consequently closed and the pressure fluid is allowed to exhaust through the other valve which simultaneously opens.

The invention will be better understood with the aid of the accompanying drawings in which—

Figure 1:
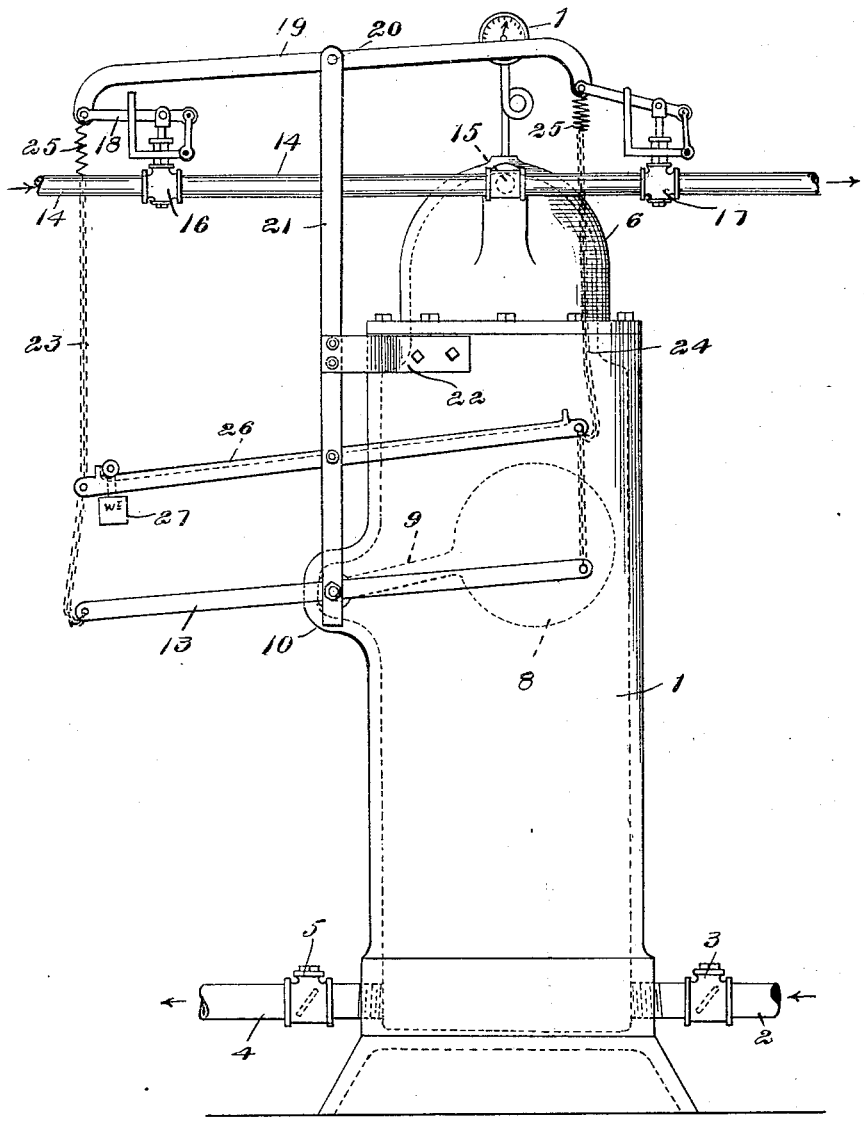
Figure 2:
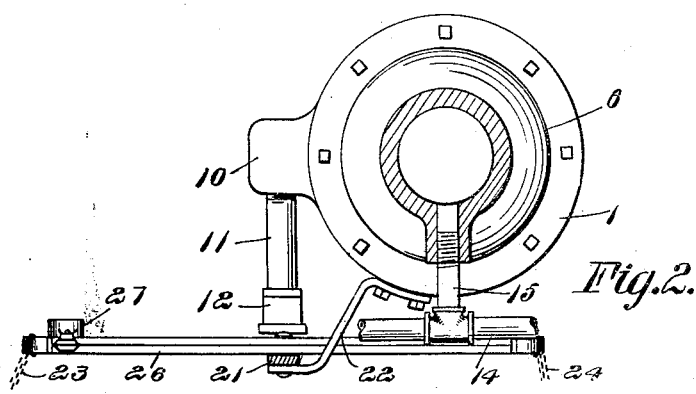
Figure 3:
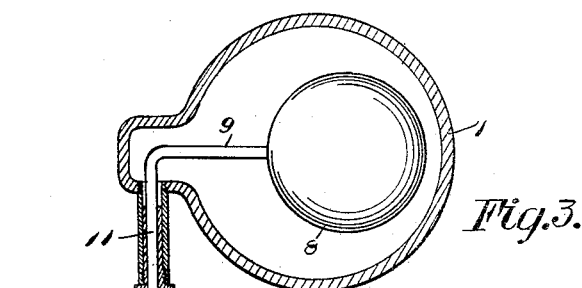
Figure 4:
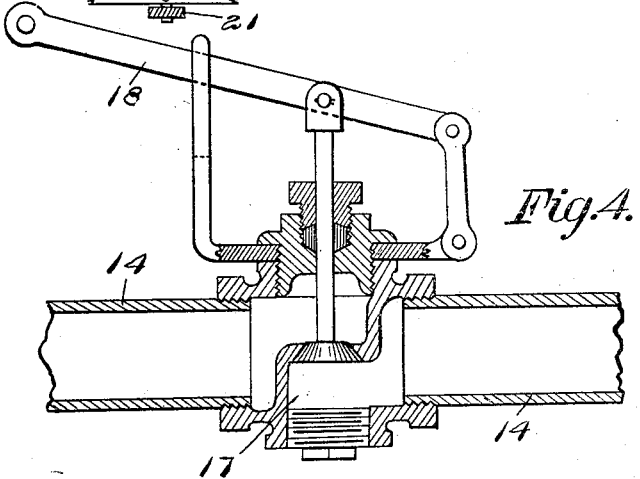

Figure 1 is a side view of the apparatus according to the invention. Fig. 2 is a horizontal section adjacent to the summit of the tank and Fig. 3 is a cross section through a point about midway of the height of the tank. Fig. 4 is a vertical section through one of the two valves which are similar in construction.

Reference being had to the drawings, 1 indicates the tank supported on a suitable base and to which, at the lower end, an inlet pipe 2 is connected having a non-return valve 3. An outflow pipe 4 having a non-return valve 5 also leads from the lower end of the tank.

The tank 1 is surmounted by a dome 6 preferably detachable and to which may be applied the pressure gage 7.

8 is the float supported intermediate of the height of the tank, and therewithin, on a lever 9 whose inner end enters a protuberance 10 of the tank and is right angularly offset to form a pivot 11 extending laterally through the protuberance and through a gland 12.

To the outer end of the pivot 11 is rigidly secured a rocking lever 13 normally in a position just off the horizontal. Thus it will be seen that as the water running through the pipes 2 and 4 tends to find its own level, the float 8 will be raised, and in rising will rock the lever 13. It is of course understood that the tank 1 is arranged at a level lower than the source and destination of the water to be raised.

14 is a steam supply pipe from which a branch 15 is taken and connected to the dome 6. At one side of this branch is an inlet valve 16 in the pipe 14 and at the other side is an exhaust valve 17, each of these valves having an operating lever 18, the pressure of which in a downward direction serves to open the valve and in an upward direction to close the valve. The extremities of these levers 18 are pivotally connected by a rocker 19 pivoted at its center 20 to a bar 21 rigidly supported by a bracket 22 secured to the side of the tank 1 and also caught at its lower end, for further support, to the projecting end of the pivot 11.

Chains 23 and 24 connect the corresponding ends of the rockers 13 and 19 so that when the rocker 13 is moved it will effect the movement of the rocker 19. Springs 25 are provided in the length of the chains 23 and 24 for the purpose hereinafter set forth.

A third rocker arm 26 is supported by the bar 21 and connected at its ends to the chains 23 and 24 so as to be affected by the movement of the rocker 13, but this rocker is provided with a rolling weight 27 adapted to freely travel from one end to the other of the rocker.

The action of the rolling weight 27 and springs 25 are very important to the operation of the valves for, by this arrangement any central position of the valves is avoided and they are positively opened or closed each time they are operated. The action of these parts is as follows:—It will be noticed that the lower section of the chain 23 is shown in the drawings hanging loosely while the upper section is taut and its spring 25 stretched. On the other side, the upper section of the chain 24 is slack and its spring contracted while the lower section of the chain 24 is taut. Now, in this position, steam entering the tank through the valve 16 forces the water out through the pipe 4 and, consequently, the float will lower as the water lowers in the tank and the first result of this will be that the weight bar or beam 26 is pulled down on the right hand side while the spring 25 on the left hand side contracts. The upper section of the right hand chain 24 will also be pulled tight during this movement and its spring 25 distended. The end of the movement referred to, brings the beam 26 just over the horizontal, but so far, the valves have not been operated at all. The weight now rolls to the right hand end of the bar giving it an extra tip on the right hand side just sufficient to operate the valves. In the reverse movement, that is to say, when the float is rising, the weight, chains and springs operate in the same way so that there is no central position of the valves, but a positive opening and closing. The said reverse movement closes the valve 16 and opens the valve 17, shutting off the steam supply, allowing that quantity of steam within the tank to escape by way of the valve 17 and permitting the water to rise again in the tank.

What I claim is:—

1. In a fluid pressure pump, a tank having a water inlet and a water outlet at the lower end and a pressure fluid inlet at the top end, a float pivotally supported within the tank, a rocking beam rigidly connected intermediate of its length to said float, so as to rock therewith, a pressure fluid supply pipe connected to said fluid inlet and valves in said pipe one at each end of the inlet arranged for one to open when the other closes and vice-versa, means operatively connecting the ends of said rocking beam to said valves, another beam suitably pivoted at its center and connected at the ends respectively to the aforesaid beam, so as to move substantially parallel with the said first mentioned beam, and a rolling weight supported by said second mentioned beam and adapted to roll from one end thereof to the other, whereby the valves are simultaneously operated, one to open and the other to close when said first mentioned beam is rocked through the movement of the float.

2. In a fluid pressure pump, a tank having a water inlet and a water outlet at the lower end and a pressure fluid inlet at the top end, a float supported within the tank on a pivot extending laterally outside the tank, a rocking beam rigidly connected intermediate of its length to the outer end of said pivot so as to rock with the float, a pressure fluid supply pipe connected to said fluid inlet and valves in said pipe one on each side of the inlet arranged for one to open when the other closes and vice versa, an operating lever extending from each of said valves, a supporting bar or bracket, an arm pivoted at its center to said bracket and at its opposite ends to said valves respectively, a spring depending from each of said operating levers, a chain connecting said beam and each of said springs to secure substantially parallel motion, another beam pivoted in said bracket at its center, and connected at the ends respectively to said chains so as to move substantially parallel with the aforesaid beam and a rolling weight supported by said second beam and adapted to roll from one end thereof to the other and to coöperate with said springs to effect the operation of the valves, said valves thereby being simultaneously operated, one to open and the other to close when the beams are tilted through the movement of the float, consequent upon the raising or lowering of the water in the tank.

Signed at Montreal, Quebec, Canada, this 18th day of January, 1915.

EUGÈNE GOILEAU.

Witnesses:
M. PATENAUDE,
C. PATENAUDE.

Copies of this patent may be obtained for five cents each, by addressing the "Commissioner of Patents, Washington, D. C."